United States Patent [19]

Cardenas-Franco et al.

[11] Patent Number: 4,708,727
[45] Date of Patent: Nov. 24, 1987

[54] METHOD AND APPARATUS FOR SYNCHRONIZING THE VELOCITY OF A 90 DEGREE PUSH-OUT APPARATUS AND OF THE CARRIER CONVERYOR IN AN I.S. GLASSWARE FORMING MACHINE

[75] Inventors: Luis Cardenas-Franco; Fernando Taddei-Contreras, both of Monterrey, Mexico

[73] Assignee: Vitro Tec Fideicomiso, Monterrey, Mexico

[21] Appl. No.: 931,213

[22] Filed: Nov. 14, 1986

[51] Int. Cl.$^4$ ............................................... C03B 9/40
[52] U.S. Cl. ........................................ 65/29; 65/160; 65/163; 65/DIG. 13
[58] Field of Search ................. 65/DIG. 13, 163, 160, 65/29

[56] References Cited

U.S. PATENT DOCUMENTS

| | | | |
|---|---|---|---|
| 4,203,752 | 5/1980 | Becker et al. | 65/163 |
| 4,247,317 | 1/1981 | Wood et al. | 65/DIG. 13 |
| 4,313,750 | 2/1982 | Lulejian et al. | 65/163 X |
| 4,409,013 | 10/1983 | Cardenas et al. | 65/163 |
| 4,615,723 | 10/1986 | Rodriguez-Fernandez et al. | 65/163 |
| 4,636,238 | 1/1987 | Sidler | 65/163 X |

*Primary Examiner*—Arthur Kellogg
*Attorney, Agent, or Firm*—Abelman Frayne Rezac & Schwab

[57] ABSTRACT

In a multi-section I.S. glassware article forming machine including handling and forming means such as a molten glass feeder, a glass gob cutting mechanism, glass gob distributor, article molding means, a take out apparatus to bring the green articles out of the molding means, a 90° push out apparatus to bring the finished articles to a carrier conveyor, and a transfer apparatus for transferring the finished articles to a cross conveyor in order for a pusher apparatus to transfer rows of articles to a lehr; synchronizaiton of the velocity of both the 90° push-out apparatus and of the carrier conveyor of each and every section of said I.S. glassware article forming machine is set and controlled at will by sensing the velocity of operation of the glass gob cutting mechanism, of the 90° push-out apparatus and of the carrier conveyor of the machine, as well as of the number of containers per time unit passing at the end of said carrier conveyor, through suitable sensor means associated therewith providing signals representative of the sensed parameters, and combining them, by means of a data processor through an algorithm contained in its memory, with the data of the sequence of triggering of the same mechanisms and of the desired spacing between the containers, fed through an operator panel associated with said data processor, to provide the necessary synchronization control signals for said 90° push-out apparatus and said carrier conveyor.

3 Claims, 2 Drawing Figures

METHOD AND APPARATUS FOR SYNCHRONIZING THE VELOCITY OF A 90 DEGREE PUSH-OUT APPARATUS AND OF THE CARRIER CONVERYOR IN AN I.S. GLASSWARE FORMING MACHINE

BACKGROUND OF THE INVENTION

Synchronization of the velocity of both the 90° push-out apparatus and of the carrier conveyor may be desirable for purposes such as to avoid the articles to fall down when reach to the carrier conveyor, to control the spacing between the fresh finished glassware articles travelling on the carrier conveyor in order for said articles to be equidistantly separated one another, for purposes such as automatic rejection of fell down, deformed or dirty articles travelling on said carrier conveyor, and row alignment at the transfer apparatus for the finishing stations.

SUMMARY OF THE INVENTION

It is therefore a main object of the present invention, to provide a method and an apparatus for synchronizing the velocity of the 90° push-out apparatus and of the carrier conveyor in an I.S. glassware article forming machine, in order to avoid fell down of the articles on transferring said articles to said 90° push-out apparatus, to control the spacing between the glassware articles on said carrier conveyor, and to align said articles on said carrier conveyor at the transfer apparatus.

It is also another main object of the present invention, to provide a method and apparatus, of the character previously disclosed, by sensing the velocity of operation of the glass gob cutting mechanism, of the 90° push-out apparatus and of the carrier conveyor of the machine, as well as of the number of containers per time unit passing at the end of said carrier conveyor, through suitable sensor means associated therewith providing signals representative of the sensed parameters, and combining them, by means of a data processor through an algorithm contained in its memory, with the data of the sequence of triggering of the same mechanisms and of the desired spacing between the containers, fed through an operator panel associated with said data processor, to provide the necessary synchronized control signals for said 90° push-put apparatus and said carrier conveyor.

These and other objects and advantages of the present invention will be apparent to those persons skilled in the art, from the following detailed description of the invention.

DETAILED DESCRIPTION OF THE INVENTION

Figure 1:
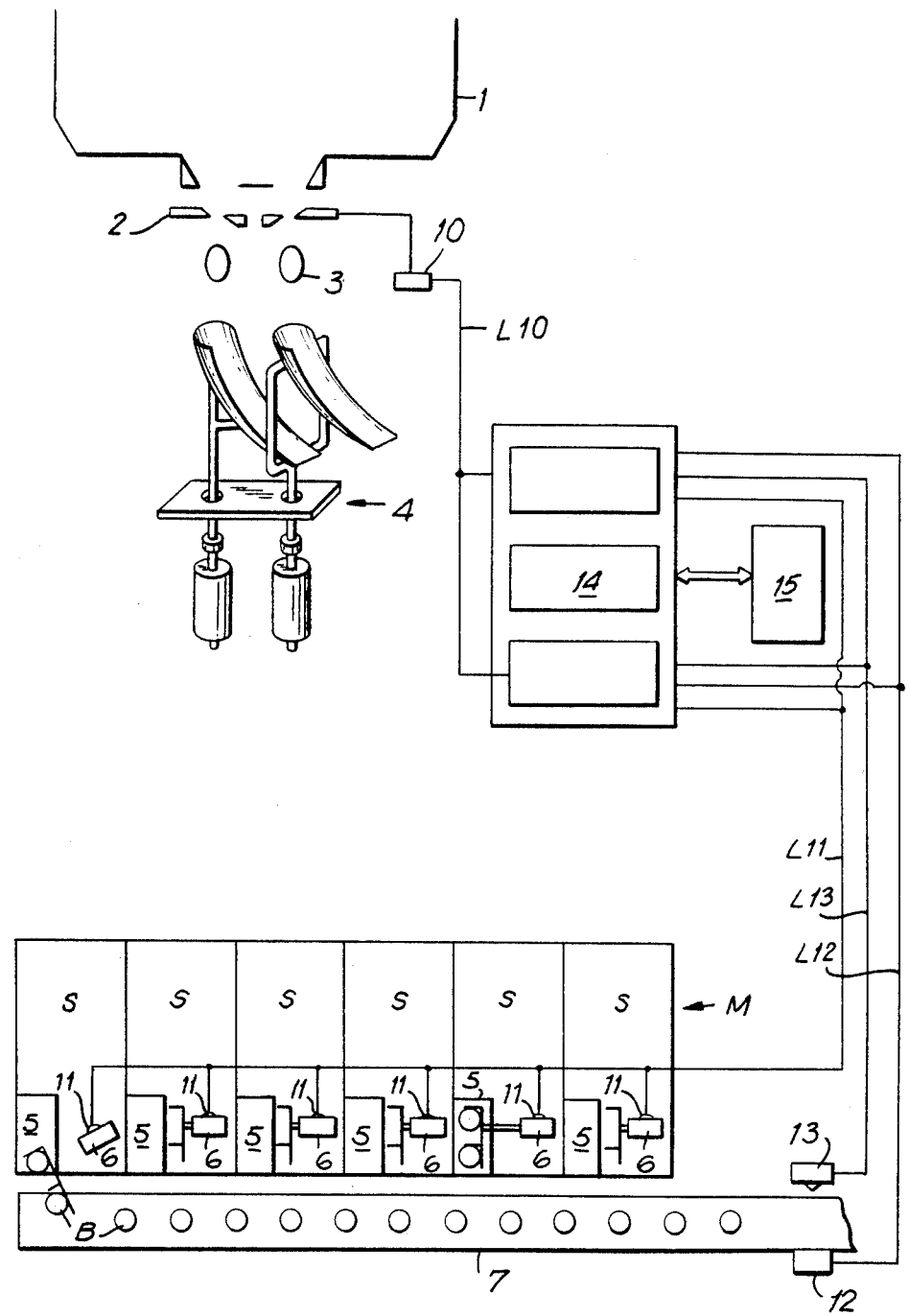
FIG. 1 is a block diagram of the apparatus of the present invention, showing all its components and their interconnection.

Referring to FIG. 1, an I.S. machine generally comprising a glass gob feeder 1 from which a stream of molten glass comes out and is cut away in glass gobs 3 by means of a cutting mechanism 2. Said glass gobs 3 are distributed, by means of a gob distributor apparatus 4, to each section S generally eight of the machine M wherein a glass container, such as a bottle B, is formed through process such as that known as blow-and-blow. Afterwards, when the glass bottle B is formed and deposited on the cooler plates called dead plates 5 of the corresponding section, a 90° push out apparatus 6 sweeps out said bottle to place it on a carrier conveyor 7 which carry all the bottles B from the sections S of the machine M to a finishing station (not illustrated). Each section may have also two, three or four cavities for processing the corresponding number of containers, for which both the glass feeder and the cutting mechanism have to have two, three or four feeding orifices and pairs of cutting blades, respectively.

The apparatus for controlling the spacing between the glass containers on the carrier conveyor of a multi-section I.S. glassware forming machine, comprises:

Glass gob sensor means 10, connected with the cutting mechanism 2 for providing a signal representative of the feeding of a glass gob B to a section S of the machine M;

first velocity sensor means 11, connected to the 90° push-out apparatus 6, for providing a signal representative of the velocity of sweep out of the containers B from the dead plates 5 of the sections S to the carrier conveyor 7, by said 90° push-out apparatus 6;

second velocity sensor means 12, connected with the carrier conveyor 7, to provide a signal representative of the velocity of advancement of said carrier conveyor 7;

counting means 13 placed at the end of the carrier conveyor 7, to provide a signal representative of the number of containers 8 per time unit travelling on said carrier conveyor 7;

a data processor 14 which receives, through lines L10, L11, L12 and L13, the respective signals provided by the glass gob sensor means 10, the first and second velocity sensor means 11 and 12 and the counting means 13 and processes them, through and algorithm, by relating them with the data of sequence of triggering of the mechanisms of the section S, contained in its memory, and with the data of the desired spacing between the containers B on the carrier conveyor 7, feed thereto through an operator panel 15, to provide synchronization control signals to said 90° push-out apparatus 6 and to the carrier conveyor 7, in order to synchronously control their velocity of operation in accordance with all the disclosed parameters in order to achieve the desired spacing between the bottles.

In this way, the data processor synchronizes the velocity of operation of the 90° push-out apparatus 6 and of the carrier conveyor 7 in accordance with the desired spacing of the containers B on the carrier conveyor 7. With said first and second velocity sensor means 12 and 13, the data processor verifies the spacing between the containers B on the carrier conveyor 7 and, if some differences in said actual spacing occurs, it determines which 90° push-out apparatus of which section, needs to be adjusted and sends the respective control signals to said mechanism in order for its velocity of operation to be advanced or delayed to get the desired spacing.

The method for controlling the spacing between the glass containers on the carrier conveyor of a multi-section I.S. glassware machine, comprising;

sensing the velocity of operation of the glass gob cutting mechanism 2, of the 90° push-out apparatus 6, of the carrier conveyor 7 and the number of container B per time unit at the end of the carrier conveyor 7, by means of the sensors 10, 11, 12 and 13;

deriving, from said sensors 10, 11, 12, and 13, signals representative of the respective sensed parameters;

feeding said derived signals as well as, through the operator panel 15, the sequence of triggering of the mechanisms of the sections of the machine and the desired spacing between the containers B on the carrier conveyor 7, to the data processor 14;

relating the derived signals with the data fed through the operator panel 15, in the data processor 14 through an algorithm contained in its memory; and, generating synchronized control signals from said data processor 14, in order to synchronously controlling the velocity of operation of the 90° push-out apparatus 6 and of the carrier conveyor 7 in accordance with the desired spacing of the containers B travelling on the carrier conveyor 7.

Figure 2:
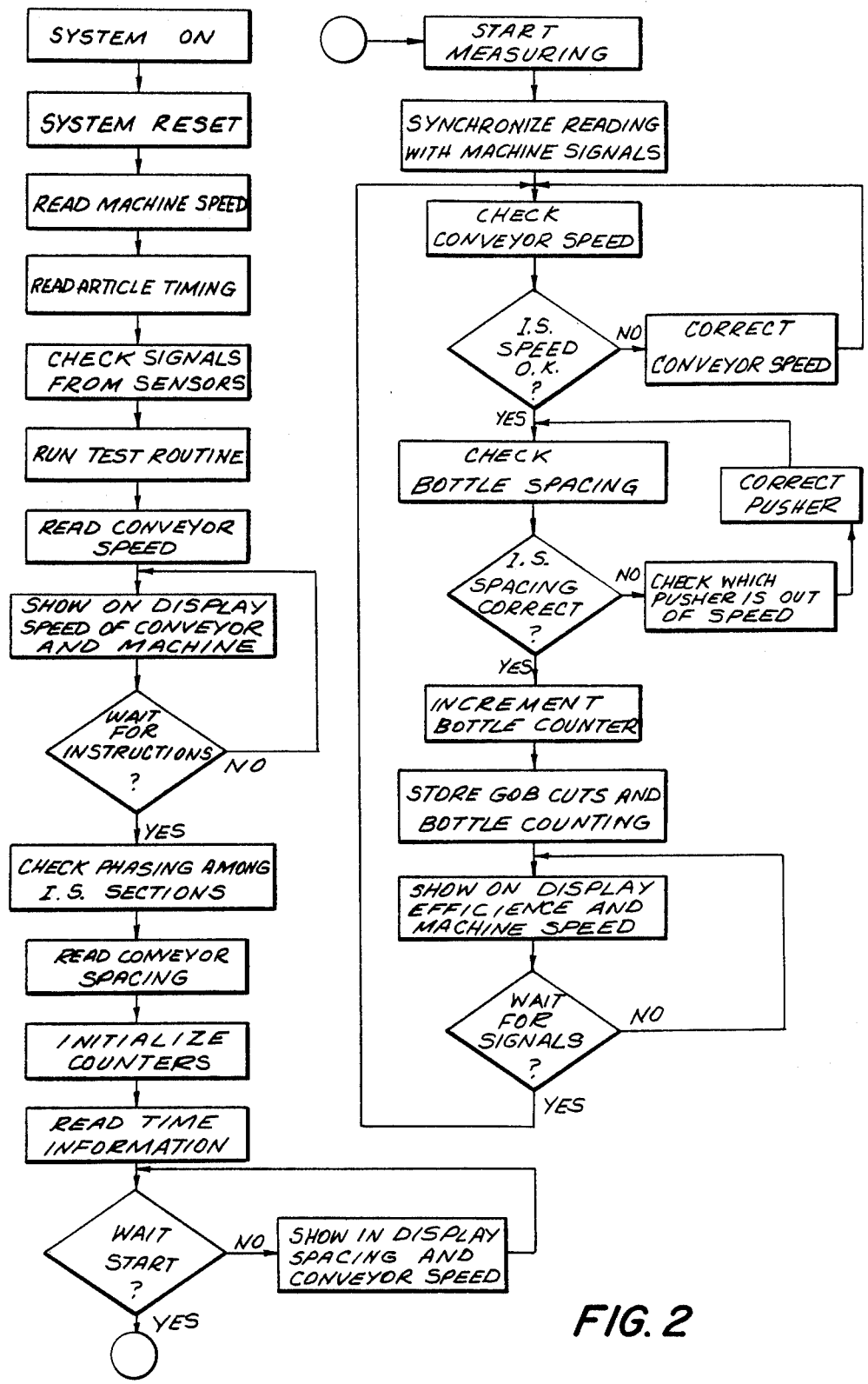
FIG. 2 is a flow diagram of the logic of operation of the method and apparatus of the present invention.

The logic of operation of the method and apparatus of the present invention, is illustrated in the flow diagram of FIG. 2 and comprising the steps of turn the "system on"; "system reset" in order to clean register memories and start operation; "read machine speed" to calculate that velocity; "read article timing" to know the article manufacturing velocity; "check signals from sensors"; "run test routine" of the mechanisms; "read conveyor speed"; "shown on display speed of conveyor and machine"; "wait for instructions" from the operator; if there are not instructions, then go to the previous step, bur if there are instructions "check phasing among I.S sections" to check the triggering sequence; "read conveyor spacing" by reading the spacing of articles on the conveyor; "initialize counters"; "read time information" from the clock; "wait start" signals; if no signal reach, "show in display spacing and conveyor speed" and again go to "wait start", but if signals are present, then "start measuring" from the sensors; "synchronize reading with machine signals"; "check conveyor speed"; ask if "is speed o.k."; if it is not o.k. "correct conveyor speed" and return to "check conveyor. speed", but if it is o.k., then "check bottle spacing"; ask if "is spacing correct"; if this is not, then "check which pusher is out of speed", then "correct pusher" and return to "check bottle spacing", but if this is it, then "increment bottle counter"; "store gob cuts and bottle counting"; "shown on display efficiency and machine speed" to the operator; and "wait for sigals", if there are not changes, then go to "shown on display efficiency and machine speed", and if there are changes then go to "check conveyor speed".

We claim:

1. In a glassware article forming machine comprising handling and forming means such as molten glass feeding means, glass gob cutting means, glass gob distribution means, forming means, a 90° push out apparatus and a carrier conveyor; a method for synchronizing the velocity of the 90° push-out apparatus and of the carrier conveyor, comprising: sensing the velocity of operation of the glass gob cutting means, of the 90° push out apparatus and of the carrier conveyor, as well as the number of articles per time unit travelling on said carrier conveyor, by means of sensor means associated with said components; deriving signals representative of the detected parameters, from said sensor means; feeding said signals to a data processor; feeding optimum predetermined operation parameters for said components as well as a desired separation data for the articles, to said data processor, through data feeding means associated therewith; relating said derived signals with the fed operation parameters in said data processor; and generating synchronized control signals from said data processor, in order to control the velocity of operation of the 90° push out apparatus and of the carrier conveyor, in accordance with the desired spacing of the glassware articles travelling on said carrier conveyor.

2. In a glassware article forming machine comprising handling and forming means such as molten glass feeding means, glass gob cutting means, gob distribution means, forming means, a 90° push out apparatus and a carrier conveyor; an apparatus for synchronizing the velocity of the 90° push-out apparatus and of the carrier conveyor, comprising: first, second and third velocity sensor means associated the glass gob cutting means, with the 90° push out apparatus, and with the carrier conveyor, respectively, to provide signals representative of the velocity thereof; counting means associated with said carrier conveyor, to provide a signal representative of the number of articles per time unit, travelling on said carrier conveyor; and a data processor which receives said signals, and comprising a memory containing optimum predetermined data of operation for said glass gob cutting means, 90° push out apparatus and carrier conveyor, including the data of the desired spacing between the glassware articles on said carrier conveyor and an algorithm to relate the received signals with the predetermined data, in order to derive control signals to synchronizing the velocity of the 90° push out apparatus with the velocity of the carrier conveyor in accordance with the desired spacing for the glassware articles.

3. The apparatus as claimed in claim 2, wherein the data processor comprising an operator panel associated with said data processor to receive and provide information to the same.

* * * * *